(12) United States Patent
Balinsky et al.

(10) Patent No.: US 8,001,016 B2
(45) Date of Patent: Aug. 16, 2011

(54) PHARMACEUTICAL PRODUCT PACKAGING

(75) Inventors: Helen Balinsky, Bristol (GB); Liqun Chen, Bristol (GB); James Thomas Edward McDonnell, Bristol (GB); Keith Alexander Harrison, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 1036 days.

(21) Appl. No.: 11/481,797

(22) Filed: Jul. 7, 2006

(65) Prior Publication Data
US 2007/0043633 A1 Feb. 22, 2007

(30) Foreign Application Priority Data
Jul. 8, 2005 (GB) .................... 0514049.6

(51) Int. Cl.
*G06Q 10/00* (2006.01)
*G01V 3/00* (2006.01)
(52) U.S. Cl. ...................... 705/28; 340/854.6
(58) Field of Classification Search .............. 705/28; 235/385; 340/5
See application file for complete search history.

(56) References Cited

U.S. PATENT DOCUMENTS

| 6,055,507 | A * | 4/2000 | Cunningham | 705/3 |
| 6,294,999 | B1 * | 9/2001 | Yarin et al. | 340/573.1 |
| 7,151,456 | B2 * | 12/2006 | Godfrey | 340/573.1 |
| 7,182,256 | B2 * | 2/2007 | Andreasson et al. | 235/385 |
| 7,239,241 | B2 * | 7/2007 | Claudatos et al. | 340/572.1 |
| 7,299,981 | B2 * | 11/2007 | Hickle et al. | 235/385 |
| 2001/0028308 | A1 * | 10/2001 | De La Huerga | 340/573.1 |
| 2002/0026330 | A1 * | 2/2002 | Klein | 705/3 |
| 2003/0160698 | A1 * | 8/2003 | Andreasson et al. | 340/573.1 |
| 2003/0221108 | A1 | 11/2003 | Rupp | |
| 2004/0046020 | A1 * | 3/2004 | Andreasson et al. | 235/385 |
| 2004/0099743 | A1 | 5/2004 | Waters | |
| 2005/0108044 | A1 | 5/2005 | Roster | |
| 2005/0110640 | A1 * | 5/2005 | Chung | 340/572.1 |
| 2007/0198569 | A1 * | 8/2007 | Johnston | 707/102 |
| 2007/0219916 | A1 * | 9/2007 | Lucas | 705/58 |
| 2007/0260487 | A1 * | 11/2007 | Bartfeld et al. | 705/2 |

FOREIGN PATENT DOCUMENTS
GB 2422514 A 7/2006

OTHER PUBLICATIONS

"Challenging 'the process is the product': clarifying the role of information technology in biopharmaceutical process development." Pharmaceutical Technology, Nov. 2004, v 28 , n 11 , p S13.*
"GB Examination Search Report", GB intellectual Property Office, GB Application No. GB0514049.6, 2 pages, Mar. 31, 2010.

* cited by examiner

*Primary Examiner* — Matthew S Gart
*Assistant Examiner* — Oluseye Iwarere

(57) ABSTRACT

A method of verifying the authenticity of a product includes reading data from a data storage device which forms part of the packaging of the product, determining from the data an identity code for the data storage device, a random first identifier allocated to the data storage device by the product manufacturer and a digital signature of a parameter which is based on at least a second identifier not derivable from the data, communicating with the product manufacturer or an entity associated therewith using the random first identifier as a reference, receiving from the product manufacturer or the entity associated therewith the second identifier, and verifying the digital signature using the second identifier.

24 Claims, 2 Drawing Sheets

F = f(MID, PID/SID, L, D, N)
SIG = signature$_M$(F) using private key $SK_M$

PHARMACEUTICAL PRODUCT PACKAGING

CLAIM TO PRIORITY

This application claims priority to co-pending United Kingdom utility application entitled, "Pharmaceutical Product Packaging" having serial no. GB 0514049.6, filed Jul. 8, 2005, which is entirely incorporated herein by reference.

TECHNICAL FIELD

This invention relates generally to pharmaceutical product packaging.

BACKGROUND

The counterfeiting of pharmaceutical products is widely recognized as a major worldwide problem, with serious public health and economic consequences. In particular, users of pharmaceutical products need to know that drugs they have been prescribed have been made by the stated approved manufacturer. In addition, users need correct expiry dates for the drugs and need to have full confidence that the drugs are correct.

The drug manufacturers also wish to ensure that users have obtained the correct drugs, but additionally aim to ensure that their drugs are not re-sold into different markets.

Various measures have been proposed to address these issues. One approach involves providing the drug packaging with some form of data storage device. The data stored enables a user to obtain data from the packaging and perform a verification operation with the drug manufacturer.

A number of different approaches have been proposed using radio frequency identification (RFID) devices.

Roger Johnston of the "Vulnerability Assessment Team" at Los Alamos National Laboratory has proposed an anti-counterfeiting approach which has been called a "Call-In the Numeric Token" method. In this proposal, a passive RFID device is provided as part of the pharmaceutical product packaging, and this device stores a unique identification number. The pharmaceutical manufacturer maintains a database of these numbers. When a user wishes to verify the authenticity of a particular drug, the identification number is provided to the pharmaceutical manufacturer either by telephone or using a web based service.

The identification number is selected at random, and the implementation proposed generates at least one thousand times more invalid identification numbers than actual valid identification numbers within a given lot. The user simply verifies with the manufacturer that the identification number is a valid number, and this provides the verification that it is highly probably that the product is from a genuine source.

Records are kept of the verifications that have been carried out, so that multiple verifications of the same identification number can be detected. This suggests that counterfeiting is taking place, and action can then be taken.

Another system has been proposed by Texas Instruments, which again uses RFID devices. In this approach, a digital signature is generated and provided in the device memory. The digitally signed information is a function (for example a hash function) of the RFID device identification number and a product manufacturer identifier. The verification procedure involves performing the same hash function on the device identification number and the product manufacturer identification number (which are obtained from the RFID device) and verifying that the result of the hash function is the same as the digitally signed version, which is obtained by applying the public key of the manufacturer. This approach enables off-line verification of the authenticity.

SUMMARY

According to the invention there is provided a method of verifying the authenticity of a product, the method comprising reading data from a data storage device which forms part of the packaging of the product, determining from the data an identity code for the data storage device, a random first identifier allocated to the data storage device by the product manufacturer and a digital signature of a parameter which is based on at least a second identifier not derivable from the data, communicating with the product manufacturer or an entity associated therewith using the random first identifier as a reference, receiving from the product manufacturer or the entity associated therewith the second identifier, and verifying the digital signature using the second identifier.

The invention also provides a method of providing data for verification of the authenticity of a pharmaceutical product, the method comprising providing a data storage device as part of the packaging of a pharmaceutical product, providing on the data storage device an identity code for the data storage device, a random first identifier allocated to the data storage device and a digital signature of a parameter based on at least a second identifier not derivable from the data, receiving a communication from a third party seeking verification information, checking that a first identifier received from the third party is a valid first identifier, and providing the second identifier to the third party, thereby to enable the third party to verify the digital signature using the second identifier.

The invention also provides a pharmaceutical product packaging comprising a data storage device storing read only data, the data comprising an identity code for the data storage device, a random first identifier allocated to the data storage device by the pharmaceutical product manufacturer or an entity associated therewith, and a digital signature of a parameter, which parameter is based on at least a second identifier not derivable from the data.

BRIEF DESCRIPTION OF THE DRAWINGS

The invention will now be described in detail, by way of example only, with reference to the accompanying drawings in which.

DETAILED DESCRIPTION OF THE EMBODIMENTS

The invention provides a verification system and method for pharmaceutical products. The method uses real-time communication between a user (which may be an individual or a pharmacy) and a drug manufacturer (or entity associated therewith) to provide verification. The verification involves verifying a digital signature, but this verification can only be performed after an initial dialogue with the manufacturer. This enables the manufacturer to monitor all requests for verification, and the manufacturer can choose not to provide the required information to enable the digital signature to be verified in suspicious circumstances.

Figure 1:
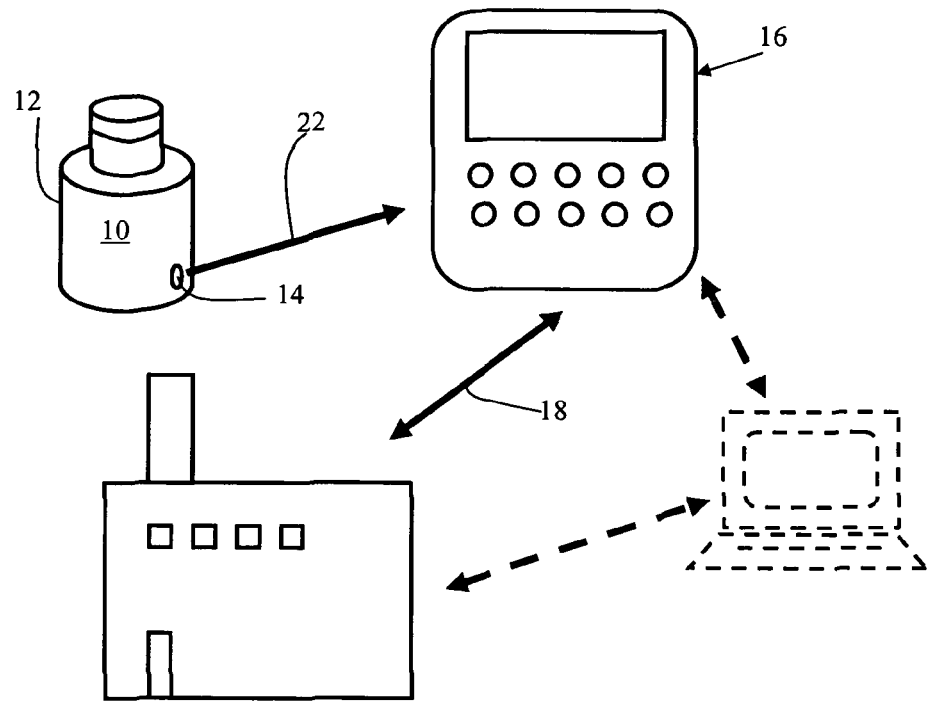
FIG. 1 shows a verification system of the invention.

FIG. 1 shows the system of the invention in which a drug 10 having packaging 12 is sold to a user. The packaging 12 includes a memory device 14 in the form of a read only device.

The user is provided with a reader for accessing the data stored in the memory device 14. The user may be an individual or a pharmacy, and the reader may be in the form of a hand held portable device 16. There is a bidirectional communications link 18 between the reader 16 and the pharmaceutical product manufacturer 20. This communications link 18 may in practice include a desktop computer with which the reader 16 communicates (as shown hatched in FIG. 1). The desktop computer can then communicate with the manufacturer 20 over the Internet.

The verification process involves reading data from the memory device 14 as shown by arrow 22, and then verifying the authenticity of the data using the bi-directional communication 18 with the manufacturer 20.

To the extent described above, the system uses the same approach as has previously been proposed.

The invention relates particularly to the nature of the data stored on the memory device 14, and the specific dialogue between the user and the manufacturer.

In particular, the two way dialogue 18 is to enable verification of a digital signature. The requirement for two way communication enables the manufacturer to keep records of the verification operations carried out, whilst the use of digital signature verification provides improved reliability of the authentication process. In particular, the digitally signed message can incorporate many different parameters relating to the pharmaceutical product, and these can all be verified by the end user. For example, the digitally signed message can include parameters derived from the drug description, images of the drug appearance and packaging, packaging identification etc. The message can contain the entire drug description, in the form of a patient leaflet. Each parameter which forms part of the digitally signed message can then be verified by the user, and this provides additional levels of authentication verification.

In order to enable these parameters to be stored on the memory device, a high data volume and high speed memory device is used, for example storing 0.5 Mbits or 1 Mbit of data, with a data transfer rate of at least 10 Mbits/sec.

Figure 2:
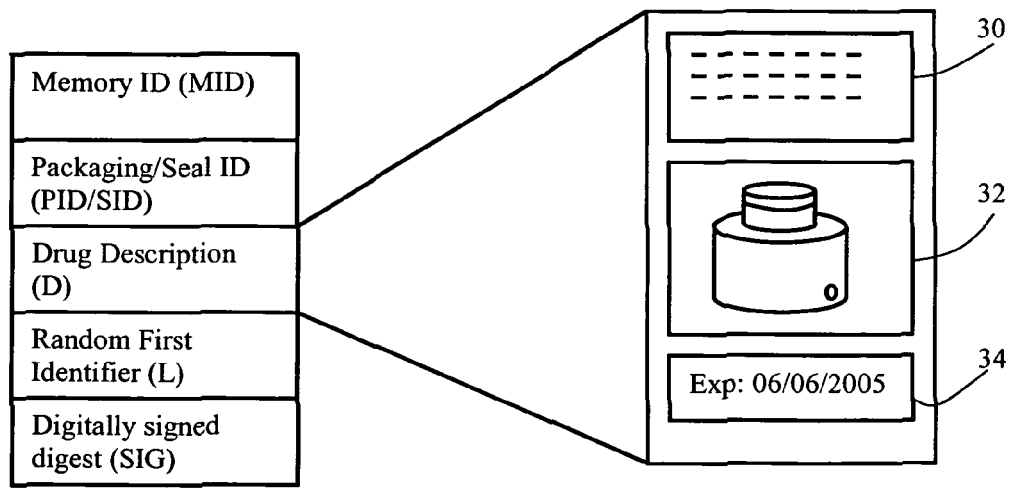
FIG. 2 shows the data stored in the storage device provided on the pharmaceutical product packaging.

FIG. 2 shows the data stored on the memory device 14.

For the correct operation of the system, the data comprises at least:

an identity code for the data storage device (MID);
a random first identifier (L) allocated to the data storage device by the pharmaceutical product manufacturer; and
a digital signature (SIG).

In the preferred implementation which will be described, the data also comprises:

a packaging identifier (PID); and
data concerning the pharmaceutical product, namely a drug description (D).

The packaging identifier may include a seal identifier (SID). Either one, or both, of a packaging identifier and a seal identifier may be used.

The use of a high data volume storage device enables the data to provide all the user information required. As shown in FIG. 2, the drug description D can include text information 30 (for example giving dosage information, drug provenance and other general advice and information) and an image file or files 32. It is preferred that the expiry date is provided, and this is shown as 34, although of course it can be part of the text file 30.

One benefit of providing all of this data on the memory device is that any identical copy of the memory device will provide the same text and image data, and it is therefore possible to detect that a product is not genuine if any of the information does not match the product. For example, the counterfeit product packaging may look different or the expiry date may have passed. The text file may indicate the presence of other packaging features, for example holograms, and all of these features make it increasingly less viable for counterfeit products to be produced. Each batch, or each individual package can have unique features. The actual individual package can be photographed during manufacture and stored on the corresponding data storage device.

In order to ensure a counterfeit product cannot be produced with a memory device which shows different images or removes any of the text or image data, the drug description forms part of the digitally signed message, in the implementation of the invention described.

FIG. 2 shows the function f which is used to form the message F to be digitally signed. The function f operates on each of the parameters MID, PID/SID, L and D. The data for each of these is provided on the memory device and is not encoded or encrypted in any form. In addition, the function operates on a second identifier, which is not derivable from the data.

This second identifier has been termed N, and is a random "nonce", for example in the form of a random number combined with a time stamp. This second identifier is kept secret by the manufacturer. This means that the digital signature verification requires the knowledge of N, and this forces a two way dialogue between the user carrying out the verification and the pharmaceutical manufacturer. However, this dialogue only needs to involve the supply of the value N if the manufacturer deems this appropriate.

The resulting message F is digitally signed using the private key of the manufacturer $SK_M$, and the digital signature SIG of the message is provided on the memory device.

The function is applied to the data using a predetermined set of rules concerning the manner in which the data is handled. In particular, the drug description can include text and image files in different formats, and the function must be applied in a uniform manner. For example, all data on the memory device will be required to be in a predefined format, and the function will operate on the data in a predefined manner.

Figure 3:
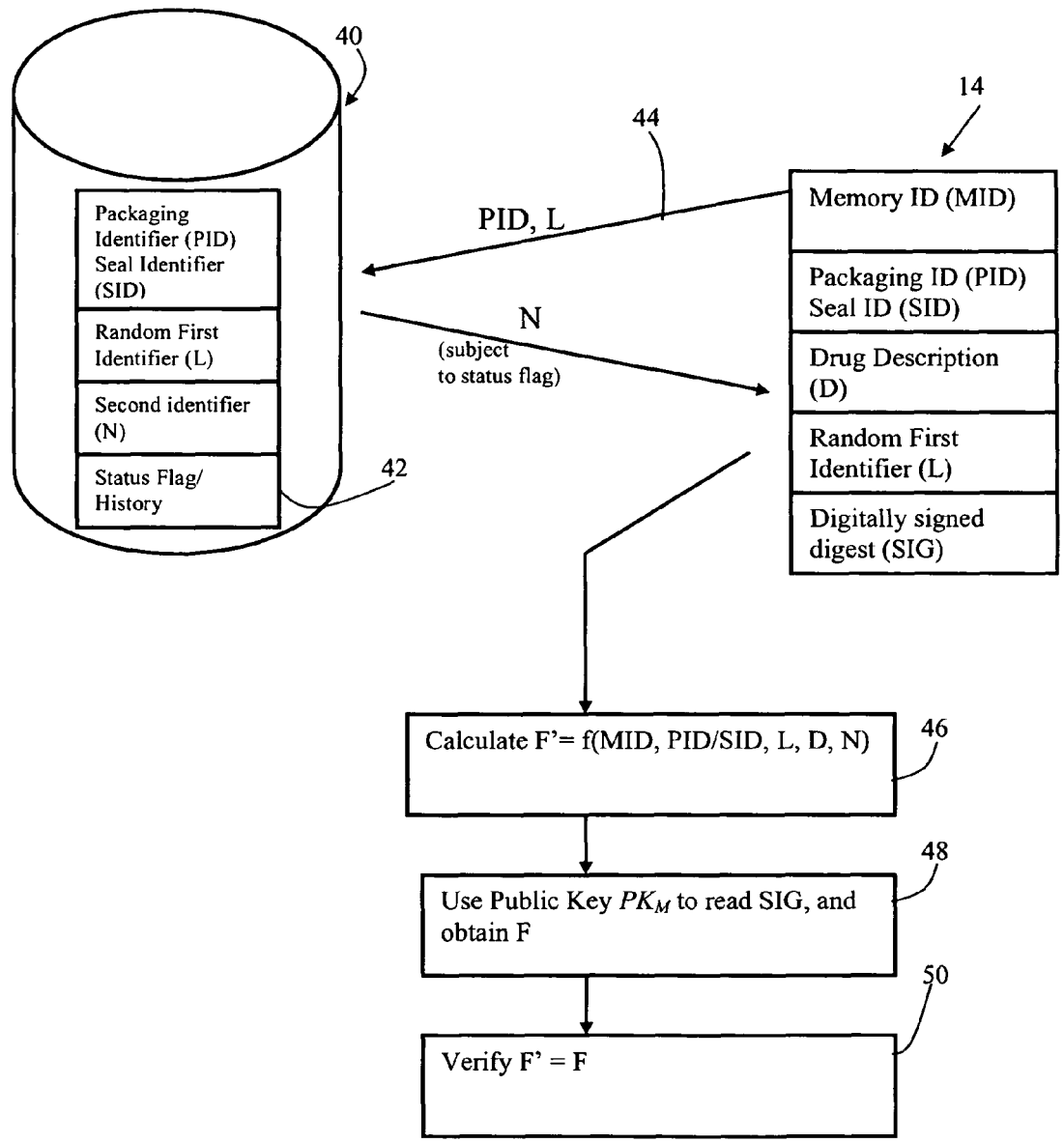
FIG. 3 is used to explain the verification methods of the invention.

FIG. 3 shows how the verification procedure takes place.

A database 40 is maintained by the product manufacturer, and this stores data referenced by the first random identifier (L). The database stores the second random identifier N as well as historical data 42 concerning the verification requests made in respect of that product. This includes a flag which can be used to control whether or not the second random identifier N is to be provided to a user. The database can also store the packaging and/or seal identifier (PID/SD), although this is not essential.

Some of the verification operations can be carried out without reference to the manufacturer, for example verifying the condition of the packaging, determining that the packaging has the correct appearance compared to the drug description data, and determining that the expiry date has not passed. These checks can be handled before or after verifying the digital signature (explained below).

In order to obtain manufacturer verification, the user reads the data from the data storage device 14, and determines from the data the random first identifier L and the packaging identifier PID. These are used as reference for communication with the manufacturer, as shown by arrow 44, although the identifier L alone may be used.

If the status flag is set to allow the release of the second identifier N, then this is communicated to the user. This communication is required because N is not derivable from the data stored in the memory device. Thus, the quantity of data and dialogue between the user and the manufacturer is kept small and can be automated. This data could also be given by telephone.

Once in receipt of the second identifier N, the user can verify the digital signature. In practice, this will be carried out automatically by the user PC (which may be a handheld device), so that in practical terms, the user simply scans the memory device, and the data is entered into the software application on the user PC, which carries out the dialogue and signature verification.

The signature verification involves reading from the memory device, in addition to the identifiers L and PID, the identity code for the data storage device MID and the drug description D, and calculating the function F' using all of this data, as shown at step 46.

The public key $PK_M$ is used to verify the digital signature within SIG (step 48), and this signature is verified when F' as calculated corresponds to the signed version (step 50).

The two-way dialogue enables the manufacturer to track the history of manufactured drugs. For example, the dialogue from the user may commence a user login, so that the manufacturer knows where the verification request is coming from. The manufacturer can determine when requests are received from locations which are different to the intended markets for the drugs. This also provides a cheap and convenient mechanism for last minute drug recall.

If no previous verification step has been carried out, the status flag will recognise this, and will permit the issuance of the second identifier N. The flag is then changed. However, if the flag is already set, a number of possibilities are possible. The manufacturer can release N with a warning, or refuse to release N. In either case, the history information can be provided to the user.

Additional rules may be put into place, for example allowing verification requests only a predetermined number of times, and/or only for a given time period after the first verification request. These rules can then take into account normal user behaviour (forgetting that they have already carried out the verification) but aiming to recognise counterfeit products.

The system described above requires read only access to the memory device. It provides valuable information for both the user and the manufacturer with minimum dialogue required and with multiple levels of verification made possible. The memory device may be a write once read many (WORM) memory, that is written once by the manufacturer and then becomes a read only memory.

As will be clear from the above, the ability of the memory device to store significant volumes of data improves the system operation. One suitable device developed by the applicant has been called the "Memspot", and is described for example in US 2004/0099743. This device uses radio frequency communication with amplitude modulation, for example amplitude shift keying (ASK). The device may typically have a data capacity of 0.5 Mbits, preferably 1 Mbits or more, and is readable with a short range reader, for example with a range of less than 5 mm. A high data transfer rate of 10 MBits/sec enables rapid data interrogation. The device can be manufactured as a capsule, for example with a square outer profile of side length 1.4 mm, and very small thickness (0.3 mm).

The first random identifier L is sufficiently large that valid numbers cannot feasibly be guessed. For example, L may have approximately 200 bits. As mentioned above, this data is read and inserted into the software for communicating with the manufacturer automatically, and is not therefore manually entered.

The size of this identifier may be different for different types of pharmaceutical product. Furthermore, a subset of the identifier, for example the first 10 bits, can be used to obtain general product information from the manufacturer but not for the verification procedure. For example, the use of 10 digits may be sufficient, particularly using an alphanumeric individual digits (for example a string of 10 digits with 50 different types of digit gives approximately $10^{17}$ combinations).

There are many digital signature algorithms which can be used in this system. The Digital Signature Algorithm (DSA) is one example. The approach described above uses a digital signature scheme with appendix (so that the original message F' is input as part of the digital signature verification). However, digital signature schemes with message recovery may also be used, in which the original message is recovered during the digital signature verification, for subsequent comparison with the calculated message F'.

The function "$f$" used to form a digest message from the various data sources can also take various forms, denoted by $y=f(x)$ where x is an input data string and y is an output data string. This function must provide the properties of one-way and collision-resistance. The one-way property means that given x it is easy to compute y but given y it is computationally infeasible to compute x. The collision-resistance property means that finding two different input data strings, $x_1$ and $x_2$ such that $y=f(x_1)=f(x_2)$, is computational infeasible. A cryptographic hash-function may be used as function 'f'. This function will be publicly known. Examples of hash-functions can be found in ISO/IEC 10118-3:2004, Information technology—Security techniques—Hash-functions—Part 3: Dedicated hash-functions.

The example above does not use any data encryption. It is possible for encryption to be built into the system. For example, in addition (or instead of) the supply of the second identifier N to a user, a decryption key may be provided, which in turn enables access to other data.

The example above uses an automated system for the verification procedure, preferably internet based. However, the same principles could be applied to a system using telephone dialogue for providing N. Of course, such a system will require shorter lengths of data in order to be practical.

The packaging can be designed so that the memory device can be read only after breaking the packaging (or performing any other irreversible operation to the packaging) and/or removing a scratch panel, or other covering device. This is made easier as a result of the use of a very short range device, for which the data transfer can easily be shielded. The memory device is designed to be written only once.

The system described above enables a drug manufacturer to obtain information concerning grey market sale of drugs even if the end user only wants to verify the provenance of the drug. The end user performs the verification procedure, and can be advised that the drug is genuine. However, this process can additionally provide grey market information to the manufacturer based on the location of the user and the known intended market of the drug. In this way, the single dialogue between the user and the manufacturer provides different desired information to both parties.

The use of a large data size device enables the transfer of traditional label (and other) information to the memory device, but still allows low data traffic between the user and manufacturer. Low data rate modems will be sufficient for this purpose, or even text messaging.

The packaging may be in the form of a glass or plastics bottle, box, tray of foil covered capsules, or any other conventional packaging. The design of the packaging will also be aimed to make counterfeiting more difficult, particularly as the memory device can include detailed information about the correct packaging, including images.

The packaging ID and seal ID (if these are used) can be verified immediately, as this data forms part of the readable data on the memory device. However, the verification of the packaging ID may be carried out after it has been determined that the data is trusted, namely after the verification process.

Tamper evident seals can be used to ensure the link between the memory device and the package, and verify that the package has not been opened. The unique seal identity SD can form part of the data stored in the memory device, as shown. The seal identity is used to prevent packaging being opened, the contents being replaced, and the package reclosed.

In all cases, the memory device forms part of the packaging, and thus cannot be removed from the packaging without damaging the packaging. The memory device may be bonded to the packaging, or physically accessible only after opening the packaging in a tamper evident way, or breaking a tamper evident seal. It may be formed within the structure of the packaging, for example in a laminated construction.

The invention can be implemented in a less robust manner than that described above, for example by avoiding the need to use packaging identifiers as part of the verification process or signed function. Similarly, it is not essential for the drug description to be included in the signed function, but this is preferred as it ties the digital signature to the product information, including appearance and expiry information. Without these functions, the invention can still provide two-way dialogue to enable a digital signature to be verified, providing the advantages outlined above.

Various other modifications will be apparent to those skilled in the art.

The invention claimed is:

1. A method of verifying the authenticity of a product, the method comprising:
   reading data stored on a data storage device which forms part of the packaging of the product, wherein said data comprises a random first identifier uniquely allocated to the data storage device and a digital signature of a parameter which is based on at least a second identifier not derivable from the data;
   communicating with the product manufacturer or an entity associated therewith using the random first identifier as a reference;
   receiving from the product manufacturer or the entity associated therewith the second identifier; and
   verifying the digital signature using the second identifier received from the product manufacturer or the entity associated therewith.

2. A method as claimed in claim 1, wherein verifying the digital signature comprises calculating the parameter, and verifying that the calculated parameter corresponds to the digitally signed parameter thereby to verify the digital signature.

3. A method as claimed in claim 1, wherein the data read from the data storage device further comprises data concerning the product.

4. A method as claimed in claim 3, wherein the data concerning the product comprises an image file showing the appearance of the product and/or the packaging.

5. A method as claimed in claim 3, wherein the data concerning the product comprises product expiry information and/or dosage information and/or drug provenance information.

6. A method as claimed in claim 3, wherein the parameter comprises a function of the data concerning the product, the first random identifier, an identity code for the data storage device, and the second identifier.

7. A method as claimed in claim 6, wherein the parameter is a function also of a packaging identifier included in the data read from the data storage device.

8. A method as claimed in claim 7, wherein the parameter is a function also of a packaging seal identifier included in the data read from the data storage device.

9. A method as claimed in claim 1, wherein the method further comprises verifying the packaging is intact.

10. A method as claimed in claim 1, wherein reading data comprises using a short range reader, with a range of less than 5 mm.

11. A method as claimed in claim 1, wherein the product is a pharmaceutical product.

12. A method of providing data for verification of the authenticity of a pharmaceutical product, the method comprising:
    providing a data storage device as part of the packaging of the pharmaceutical product;
    storing data on the data storage device, wherein said data comprises an identity code for the data storage device, a random first identifier uniquely allocated to the data storage device and a digital signature of a parameter based on at least a second identifier not derivable from the data; and
    upon receipt of the first identifier from a third party and upon verification that the received first identifier is valid, providing the second identifier to the third party, thereby to enable the third party to verify the digital signature using the second identifier.

13. A method as claimed in claim 12, further comprising providing a public key to the third party to enable the third party to verify the digital signature.

14. A method as claimed in claim 12, wherein the data stored on the data storage device further comprises data concerning the pharmaceutical product.

15. A method as claimed in claim 14, wherein the data stored on the data storage device further comprises an image file showing the appearance of the product and/or the packaging.

16. A method as claimed in claim 14, wherein the parameter is a function of the data concerning the pharmaceutical product, the first random identifier, the identity code and the second identifier.

17. A pharmaceutical product packaging comprising a data storage device storing read only data, the data comprising:
    an identity code for the data storage device;
    a random first identifier allocated to the data storage device by the pharmaceutical product manufacturer or an entity associated therewith; and
    a digital signature of a parameter, which parameter is based on at least a second identifier not derivable from the data.

18. A pharmaceutical product packaging as claimed in claim 17, wherein the data further comprises data concerning the pharmaceutical product.

19. A pharmaceutical product packaging as claimed in claim 18, wherein the data further comprises an image file showing the appearance of the product and/or the packaging.

20. A pharmaceutical product, comprising:
    a drug; and
    a packaging as claimed in claim 17.

21. A method as claimed in claim 1, wherein verifying the digital signature comprises using a public key of the manufacturer or the entity associated therewith.

22. A method as claimed in claim 12, further comprising: determining whether or not to release the second identifier to the third party based on history information that indicates a possible previous release of the second identifier.

23. A method as claimed in claim 22, wherein, if the history information indicates that the second identifier has been released before, refusing to release the second identifier to the third party; or releasing the second identifier to the third party with a warning.

24. A method as claimed in claim 23, further comprising:

providing the history information to the third party.

* * * * *